US012266070B2

United States Patent
Burgos Artizzu et al.

(10) Patent No.: US 12,266,070 B2
(45) Date of Patent: Apr. 1, 2025

(54) METHOD FOR GENERATING A VIRTUAL 4D HEAD AND TEETH

(71) Applicant: MOVUM TECH, S.L., Madrid (ES)

(72) Inventors: Xavier P. Burgos Artizzu, Madrid (ES); Wenceslao Piedra Cascón, Madrid (ES)

(73) Assignee: MOVUM TECH, S.L., Madrid (ES)

( * ) Notice: Subject to any disclaimer, the term of this patent is extended or adjusted under 35 U.S.C. 154(b) by 154 days.

(21) Appl. No.: 18/023,906

(22) PCT Filed: Sep. 27, 2021

(86) PCT No.: PCT/ES2021/070695
§ 371 (c)(1),
(2) Date: Feb. 28, 2023

(87) PCT Pub. No.: WO2022/069775
PCT Pub. Date: Apr. 7, 2022

(65) Prior Publication Data
US 2023/0260238 A1     Aug. 17, 2023

(30) Foreign Application Priority Data
Sep. 30, 2020   (ES) .................................. 202030984

(51) Int. Cl.
*G06T 19/20*     (2011.01)
*A61C 13/34*     (2006.01)
(Continued)

(52) U.S. Cl.
CPC .............. *G06T 19/20* (2013.01); *A61C 13/34* (2013.01); *G06T 7/251* (2017.01); *G06T 7/75* (2017.01);
(Continued)

(58) Field of Classification Search
CPC ........... G06T 19/20; G06T 7/251; G06T 7/75; G06T 13/40; G06T 2207/10016;
(Continued)

(56) References Cited

U.S. PATENT DOCUMENTS

| 2004/0015327 A1 | 1/2004 | Sachdeva et al. |
| 2004/0197727 A1 | 10/2004 | Sachdeva et al. |

(Continued)

FOREIGN PATENT DOCUMENTS

| CN | 108961369 A | 12/2018 |
| CN | 107657664 B | 7/2020 |

(Continued)

OTHER PUBLICATIONS

Jorg Haber et al., "Facial modeling and animation", Conference Lecture Notes, Aug. 8, 2004, p. 6-es, International Conference on Computer Graphics and Interactive Techniques.
(Continued)

*Primary Examiner* — Said Broome
*Assistant Examiner* — Andrew Shin
(74) *Attorney, Agent, or Firm* — Hayes Soloway P.C.

(57) ABSTRACT

It refers to the digitalization in three dimensions of a patient's head, intraoral maxillary and mandibular regions and bones. It includes integration of the facial movement to simulate the aesthetical and functional result before medical treatment, which could include surgery, and orthodontic and/or prosthodontic treatments. It comprises: creation of a 3D virtual model of the patient's head (2), creation of a 3D model of the patient's denture (4), fusion and anchoring of the 3D denture model (4) into the 3D head model (2), animation of the 3D head model (2) from 2D images (5) of the patient, resulting in an animated 3D model (6), animation of the 3D denture model (4) from 2D images (5) of the patient, and fusion with the 3D animated model (6), obtain- (Continued)

ing an animated 3D model of the patient's head and denture (7).

13 Claims, 5 Drawing Sheets

(51) Int. Cl.
  *G06T 7/246* (2017.01)
  *G06T 7/73* (2017.01)
  *G06T 13/40* (2011.01)
(52) U.S. Cl.
  CPC .... *G06T 13/40* (2013.01); *G06T 2207/10016* (2013.01); *G06T 2207/20036* (2013.01); *G06T 2207/20081* (2013.01); *G06T 2207/20084* (2013.01); *G06T 2207/30036* (2013.01); *G06T 2210/41* (2013.01); *G06T 2219/2004* (2013.01)
(58) Field of Classification Search
  CPC ........... G06T 2207/20036; G06T 2207/20081; G06T 2207/20084; G06T 2207/30036; G06T 2210/41; G06T 2219/2004; G06T 2219/2021; A61C 13/34; A61C 7/002; G16H 50/00
  See application file for complete search history.

(56) References Cited

U.S. PATENT DOCUMENTS

| | | |
|---|---|---|
| 2011/0304629 A1 | 12/2011 | Winchester |
| 2017/0065379 A1* | 3/2017 | Cowburn ............ A61C 13/0004 |
| 2021/0390687 A1* | 12/2021 | Salah .................... G06N 3/045 |

FOREIGN PATENT DOCUMENTS

| | | |
|---|---|---|
| WO | 2015123759 A1 | 8/2015 |
| WO | 2018154154 A1 | 8/2018 |

OTHER PUBLICATIONS

Kawai Masahide et al., "Automatic Photorealistic 3D Inner Mouth Restoration from Frontal Images", Conference Lecture Notes, Dec. 8, 2014, p. 51-62, Advances in Biometrics: International Conference.

Yuencheng Lee, "Realistic Modeling for Facial Animation", Presentation, 1995, 1-19, SIGGRAPH '95: Proceedings of the 22nd annual conference on Computer graphics and interactive techniques.

Volker Blanz, "A morphable model for the synthesis of 3D faces", Presentation, 1999, 1-15, SIGGRAPH '99: Proceedings of the 26nd annual conference on Computer graphics and interactive techniques.

Marco Tarini, "Texturing Faces", Article, 2002, 89-98, Proc. Graphics Interface 2002.

Kolja Kahler, "Reanimating the Dead: Reconstruction of Expressive Faces from Skull Data", Article, 2003, 1-18, vol. 22, No. 3, ACM TOG (Siggraph conference proceedings).

George Borshukov, "Universal Capture Image based Facial Animation and Rendering for "The Matrix" Sequels", 2004, Presentation, 1-16, SIGGRAPH '05: ACM SIGGRAPH 2005 Courses.

Demetri Terzopoulos, "Behavioral Animation of Faces: Parallel, Distributed and Real-Time", Presentation, 2004, 1-10, SIGGRAPH Course Notes.

* cited by examiner

| Transition | Upper lip movement | Lower lip movement | Chin movement | Upper denture movement (maxillary) | Lower denture movement (mandible) |
|---|---|---|---|---|---|
| Neutral -> Smile | Up | Down | None | None | Up slightly |
| Neutral -> "U" | Up | None | Down | None | Down |
| Neutral -> "S" | None | Down | None | None | Down |
| Head rotations | Rotation + movement according to facial expression | Rotation + movement according to facial expression | Rotation + movement according to facial expression | Rotation | Rotation + movement according to facial expression |

FIG. 5

METHOD FOR GENERATING A VIRTUAL 4D HEAD AND TEETH

CROSS-REFERENCE TO RELATED APPLICATIONS AND PRIORITY

This patent application claims priority from PCT Application No. PCT/ES2021/070695 filed Sep. 27, 2021, which claims priority from Spanish Patent Application No. P202030984 filed Sep. 30, 2020. Each of these patent applications are herein incorporated by reference in their entirety.

OBJECT OF THE INVENTION

The present invention relates to the field of medicine, and refers specifically to the concept of virtual patients in 4D (four dimensions). This concept, as well as the method outlined in this invention, includes the digitalization in three dimensions of the patient's head, intraoral maxillary and mandibular regions, bones and adjacent anatomical structures. It also includes the integration of the facial dynamics movement to simulate the esthetical and functional outcomes before medical treatment begins, which could include surgery, as well as orthodontic and/or prosthodontic treatments.

BACKGROUND OF THE INVENTION

Contemporary oral rehabilitations involve comprehensive diagnosis and treatment planning. The incorporation of facial references during the digital diagnostic waxing phase, ensures esthetic and functional integration of the final prosthetic rehabilitation with the patient's face. Moreover, the visualization of the treatment outcome obtained through the virtual simulation performed before treatment, enhances the communication with the patient and between clinicians and laboratory technicians, increasing the predictability of the final result.

Facial references can be integrated in the patient's face using 2D photographs at different positions or in a 3D facial reconstruction. Several 3D facial scanning methodologies are available such as photogrammetry, stereophotogrammetry, laser-beam scanning, structured-light scanning and dual structured-light scanning with infrared sensors. Photogrammetry and stereophotogrammetry are passive methods, while laser-beam scanning and structured-light scanning technologies employ active 3D sensors, where light patterns are projected onto the soft-tissue of the patient's face to be captured by high-resolution camera or cameras by using active triangulation.

Active and passive methods have demonstrated to be accurate obtaining 3D facial reconstructions to be applied in dentistry. A facial digitizer generates a specific digital file format such as standard tessellation language (STL), tessellation with polygonal faces (OBJ) or Stanford triangle (PLY) files. An STL file describes only the surface geometry, while OBJ and PLY files incorporate information regarding surface geometry, color and texture, the latter being the optimal files for facial reconstructions.

Currently, alignment of the patient's teeth in the face has to be done with extraoral positioning devices known as "scanbodies", which are elements designed to allow the integration of the upper jaw, lower jaw and its anatomical adjacent structures into the patient's head. However, actual digital protocols and available CAD software only allow importing static 3D models (STL, OBJ, PLY, etc . . . ) of the patient's face.

This approach has several limitations as:
- facial and lip dynamics are not considered, being crucial when dental, maxillofacial or medical esthetic treatments are required.
- the 3D digitized smile position obtained is not real since the patient needs to maintain that position during facial scanning procedures and,
- several 3D facial scans (normal position, rest position, smile position and "scanbodies" position) are necessary to virtualize a static 3D patient. This approach is time-consuming and involves misalignment between the meshes.

Moreover, a workflow to estimate facial movements has been proposed, but several facial scans with different facial expressions are required to integrate all of them in a reverse engineering software. This approach supposes a novelty, but it does not resolve the above limitations mentioned. These limitations could be avoided if real facial dynamics captured through a 2D video are integrated in the 3D rest position mesh, allowing to obtain real facial dynamics.

On the other hand, from the prior state of the art the document US2004015327A1 is known, which describes a procedure where facial and intraoral scans are performed using a combination of different methods (X-Rays, MRI, CBCT, etc . . . ) and combined (automatically, manually or semi-automatically), to generate a patient's face with the patient's teeth, which can later be displayed.

The document US2011304629A1 is also known, consisting of the animation of a 3D model, which can be an avatar or a real model, based on the facial expressions shown in a 2D video of the patient. That is, it focuses on the detection of facial expressions and their transfer to a 3D model.

SUMMARY OF THE INVENTION

The object of this invention, a method to generate a patient's virtual four dimensional model of head and denture, allows to resolve limitations of prior proposed methods, which can be called static since they are based in performing as minimum of three facial scans of the user: 1) a facial scan while smiling, 2) a neutral pose facial scan, 3) a facial scan with markers placed in such a way to allow facial scans to be aligned between them and to introduce the upper and lower jaws at their correct position.

This superposition of different static 3D meshes with different patient expressions leads to an imprecise alignment resulting in a faulty process. Furthermore, to perform the facial scan while the user is smiling, it is needed that the patient maintains the smile position for 15-20 seconds, resulting in an unnatural smile.

Furthermore, even after the patient's 3D head model and 3D denture models have been created and aligned, being able to dynamically animate denture and head according to the patient's facial expressions through specific animation software and animation knowledge, reaching a fully animated 3D model is not as simple as transferring the observed movement in a 2D video on the facial landmarks (lips, eyes, chin, brows) to the 3D head and denture model.

The table of FIG. 5 outlines the movement suffered by the denture and facial landmarks of a patient when speaking, smiling and/or turning the head.

As shown in the mentioned table (FIG. 5), there is not a direct rule between the movements of the lips and/or chin and those of the upper and lower denture. While the maxillary does not move apart from rotations of the head, the mandible can move very differently with respect to the lips and/or upper chin. It is worth noting at this point that detection and tracking of facial landmarks by current state-of-the-art methods does not include the estimation of the position of the teeth, since these are often not visible, being occluded partially or completely by the lips.

Therefore, using these static techniques, the movement observed in the 2D video cannot be transferred to the 3D denture model. It is necessary to incorporate novel technical solutions that use all the facial cues to determine the position of the denture as a function of the current expression portrayed by the individual.

All of the aforementioned issues can be resolved with the method object of the present invention, which allows a complete reconstruction of the head of a user, both extraoral as well as of his/her denture and facial dynamics, generating a four-dimensional model completely parametrized, which later can be used to plan for dental, maxillofacial or aesthetical treatments. Moreover, the proposed method also allows to animate said model, in such a way that the patient may observe his/her appearance before and/or after the medical treatment, all the while portraying natural facial expressions in front of a camera.

In the present procedure object of the invention only one facial scan in neutral position is needed, compared to prior invention WO2018154154, where up to seven facial scans were needed. The present approach object of the invention eliminates the superimposition procedure of different facial scans data, reducing misalignment errors.

Then, a video is recorded of the patient maintaining a conversation and/or acting spontaneously and showing different expressions such as smile, surprise, etc. The video can be recorded either in real-time or for its later storage. Then, the idea is to transfer the patient's facial movements in the video to the 3D mesh created after the scans, allowing said mesh to move similarly to the patient. This method allows therefore to obtain a dynamic virtual patient, as opposed to the static and unrealistic facial poses obtained with prior methods.

More specifically, the method consists of two separate phases. The first phase is generally performed off-line and consists of data preparation. This first part only would have to be performed once for each patient (for example, during the patient's first clinical appointment). The data generated in this phase is used by the second phase, which can be performed on-line if so desired and that can be repeated as many times as desired, providing different input videos (or other types of real-time images) of the patient.

In the first phase, all data necessary to create a virtual 3D replica of the patient's physiognomy is prepared, including the head in the first step and the denture in a second step. The model of the patient's head needs to be as similar to the real head as possible. The denture can be the actual patient's denture (which needs to be repaired for some reason) or a completely new denture designed from scratch (for example for a patient which has lost the original denture completely and requires a full reconstruction).

Therefore, in the first step a 3D virtual model of the head of the patient is generated from facial scan data. The facial scan can be performed using any of the known methods, including but not limited to:
 a 3D stitching software to create a 3D model from several photographs of the patient's face taken from different angles
 a 3D stitching software which combines photographs with depth information provided by a depth sensor camera
 a 3D scanner and its associated software.

In general, a unique 3D head model is used, but the method proposed can also be applied when more models are available (for example, 3D separate models representing different facial expressions).

In a second step, a 3D denture model is obtained, where said denture can be the actual patient's denture, a reconstruction of the denture after treatment or a completely new denture. The model includes both the upper and lower teeth as well their occlusal relationship. This model can include color information, similarly to the 3D head model.

The information necessary for the construction of the model can be obtained in several different ways:
 using an intraoral scanner
 using conventional reversible or irreversible impression materials which are later digitized with a laboratory or intraoral scanner.

Once both models are created, they are fused together in a third step, anchoring the 3D position of the denture inside the mouth of the 3D model of the head. This initial position of the digitized teeth will be used as baseline or initial position and corresponds to the one obtained during the patient's neutral pose, when looking directly in front of the camera.

The fusion of both models can be realized either manually or automatically:
 Manually: using a 3D mesh manipulation software to integrate manually both meshes in such a way that the denture is at its natural resting position.
 Automatically: using specific tools and protocols as iterative closest point (ICP) and best-fit alignment algorithms to integrate successfully the scanned teeth of the patient into its digitized head, through specific Clinical Aided Design (CAD) software to align all 3D meshes through common points to achieve the digital planning on the patient's denture.

Additionally, in this first phase, the method can further include a step to determine the movement of the 3D denture model with respect to the 3D head model. This determination of relative movement can be achieved by acquiring a database formed by 2D photographs of people performing facial expressions (talking, smiling, etc.) and their corresponding 3D model including the denture's exact position.

The objective is to add movement to the standard 3D model, including the information of how the 3D denture model moves with respect to the 3D head model in each case. In other words, for each photo in 2D its corresponding 3D model is required, including full denture at its correct position.

Said position can be estimated by an expert which places the denture manually using 3D animation software or, alternatively, the estimation can be performed, from the aforementioned database, via a Deep Learning based method (artificial neural network) who learns to estimate the 3D denture model movement from a 2D face image. Once trained, the network can be used in real-time to estimate the 3D denture position from a 2D photograph of the patient's face.

Thereupon starts the second phase of the method, during which the esthetics of the new denture of the patient is simulated (independently to the type of teeth reconstruction performed, partial or total) and at the same time the natural, real facial movements and expressions of the patient are captured (e.g., smile, frown, talking, head movements, etc.).

Input data are the 3D head and denture models created during the first phase, together with 2D images of the patient. The 2D images can be captured with a standard video camera or with a smartphone for example, and can be either previously stored or acquired in real-time.

The patient will face the camera and portray freely any action desired (facial expressions, talking, head movements, etc.). These movements will then be reflected in a new simulated video (or in real-time) allowing the patient to see how each one of the movements performed is translated into the head and denture model, and seeing how the denture reconstruction will look like. To this effect, the second phase comprises a series of steps.

In the first step, an animation of the 3D head model is obtained, based on the 2D input images. Given an input video (or real-time footage), composed of individual frames (color 2D images of the patient's face), the 3D head mesh is animated correspondingly. The result is a 3D animated model mimicking the movement observed in the 2D image, both in terms of the general head position as well as its facial physiognomy.

Then, in the second step, the 3D denture model is positioned inside the animated model. To this effect, once the head 3D model has been animated to reflect the action represented in the 2D input patient's image, the 3D denture model needs to be moved correspondingly, taking into account the movement observed in the patient's face.

The amount of movement to apply to the 3D denture with respect to the head is computed preferably by using the artificial neural network obtained during the first phase, resulting in an estimation of the 3D denture's position.

Finally, the method can comprise a 2D in-painting step, where texture is added, creating a final realistic result. To this effect, once the head and denture 3D models are in their correct position, the final 3D scene rendering is computed and projected back to 2D. The projection is done in such a way that the final model has a similar size and position compared to the 2D input video, so that the simulation is more realistic and aesthetically plausible with respect to the real input.

The method of the present invention could be used by any dentist and/or medical professionals to dynamically virtualize their patients and use it as a diagnostic and treatment planning and/or as a marketing tool. However, professionals that will most benefit from this method are dental laboratory technicians, since they could have in their computer and CAD software a fully virtual copy of the patient, including their facial dynamics, which would allow them to individualize the oral rehabilitations of each patient taking into account their facial mimic, mandibular dynamics and occlusion. Currently, there is no available dental CAD software on the market which could import a 4-dimensional model integrated with the facial dynamics of the patient and its corresponding 3D scanned upper and lower jaws, acting as an integrated whole. It can also be useful in other medical areas such as esthetic surgeries and in other facial reconstruction not directly related to dentistry.

In summary, the method object of this invention presents the following advantages:

- It saves time compared to current methods.
- It uses technology that is easy to use and implement ("user-friendly").
- It transfers the patient's real facial movement to 3D static meshes, and does so while reducing mesh alignment errors.
- It allows to integrate facial and mandibular dynamics of patients into CAD software.

BRIEF DESCRIPTION OF THE DRAWINGS

The present description is best understood from the following detailed description when read in conjunction with the accompanying drawings, which have an illustrative and not limitative nature. The drawings include the following figures briefly described below:

FIG. 5.—Shows a table with the movement of the different facial features of the patient according to his/her gestures.

DETAILED DESCRIPTION OF THE PREFERRED EMBODIMENTS

The present description, supported by FIGS. 1 to 5, illustrate the principles of the present disclosure and the preferred realization of the method proposed to generate a four-dimensional virtual model of the head and denture.

Figure 1:
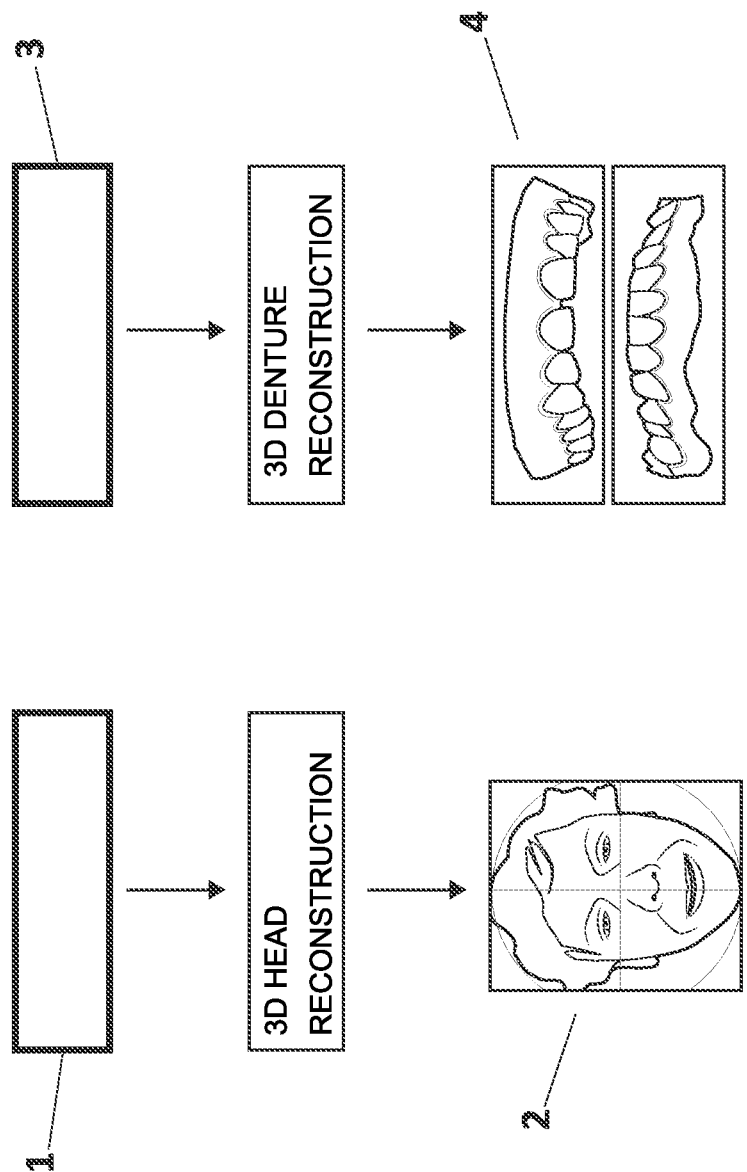
FIG. 1.—Shows a flowchart of the first phase of the proposed method: data preparation.

The method consists of two different phases. The first is shown in FIG. 1 and the second in FIG. 2. The first phase is performed off-line, only once for each patient, and consists of data preparation. The result of the first phase is the patient's 3D head model (2) and 3D denture model (4). These models (2,4) are used in the second phase of the method, which is performed on-line and can be repeated as many times as desired.

During the first phase, the method comprises a first step during which the patient's 3D head model (2) is generated either from a series of photographs of the patient or from a 3D scanning of the patient's head, as shown in FIG. 1.

The 3D head model (2) is a standard triangular mesh (3D vertices, faces and normals). The head model (2) also comprises color information (texture). This model is computed from data obtained during the patient's facial scanning.

In general, a single 3D head model (2) is used, but the method can also be applied when more models are available (for example, having separate 3D models representing different facial expressions such as smiles, etc.)

In a second step of the first phase, the patient's 3D denture model (4) is obtained, which will be used for the reconstruction. Once again, this model (4) is a standard triangular mesh composed of 3D vertices, faces and normals. The 3D denture model (4) includes upper and lower denture as two separate meshes together with their occlusal information. This model, similarly to the head model, can also include color information (texture).

The denture model (4) is obtained from denture location data (3), which can be obtained using an intraoral scanner or from conventional reversible or irreversible impression materials, which are later digitized with a laboratory scanner or an intraoral scanner.

Subsequently, specific CAD software is used to perform digital waxing procedures, orthodontic movements, implant planning or any other type of procedure from the 3D denture model (4). This workflow is performed in all those cases where the patient requires dental esthetic treatments or when an oral rehabilitation is performed.

Once both models (2,4) are created, in a third step they are combined together, anchoring the 3D denture model's (4) position inside the mouth of the 3D head model (2). This initial position will be used as baseline or resting position during a neutral pose, when the user is looking directly in front of the camera.

Figure 4:
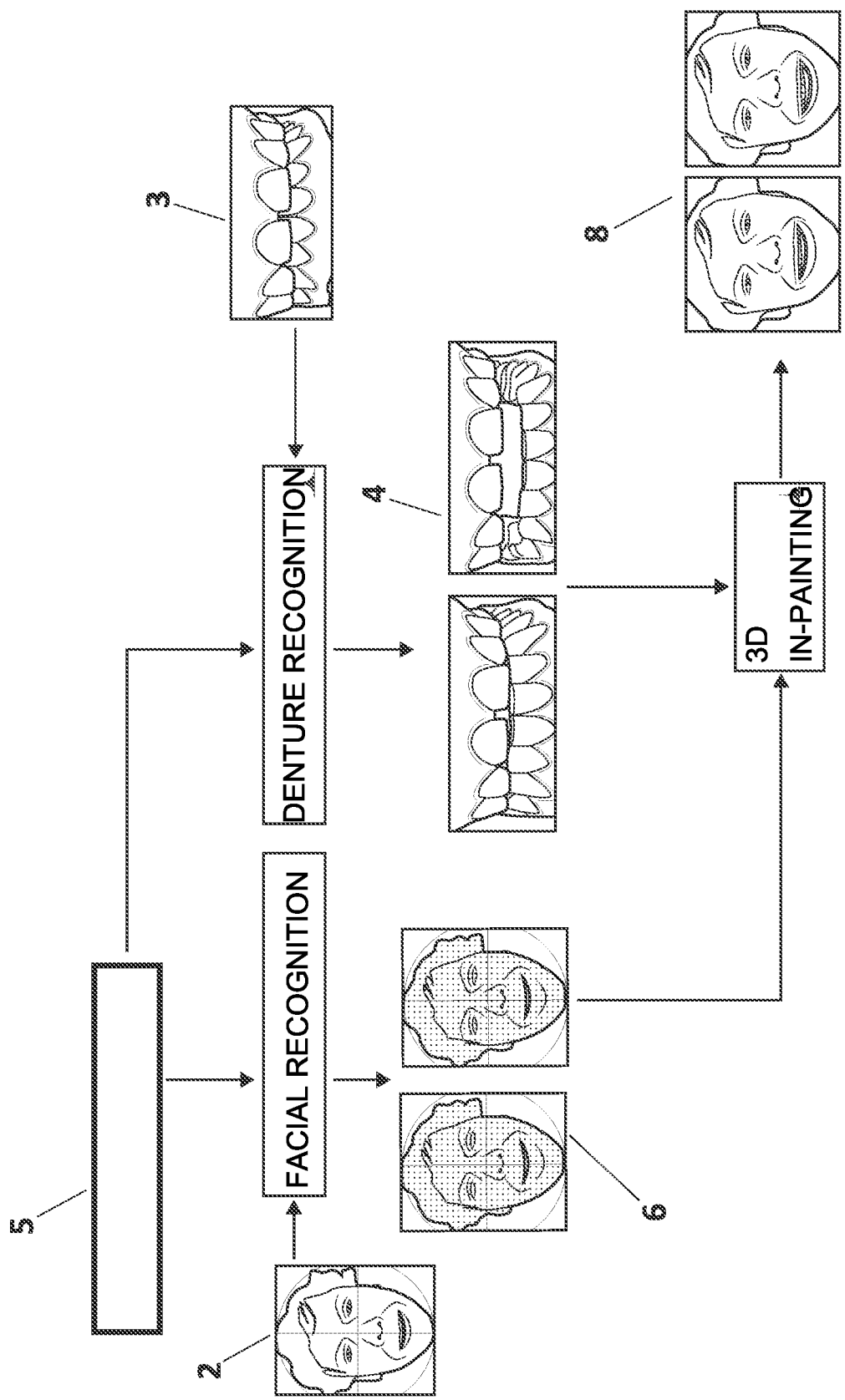
FIG. 4.—Shows a flowchart with the full outline of the proposed method.

Additionally, in a fourth step of the first phase, which is shown in detail in FIG. 4, the method comprises a step to compute the 3D denture model's (4) position with respect to the 3D head model (2). This relative movement computation is performed using a database containing 2D photographs of people moving their mouth (talking, smiling, etc.) and their corresponding 3D model, including their teeth. In this step, a general head & denture can be used, not requiring a specific model of each user.

Therefore, the goal is to augment the movement of a full 3D standard model with information on how the 3D denture model (4) has moved with respect to the 3D head model (2) in each case. Namely, for each 2D photograph, its corresponding 3D model including denture at its correct position is needed.

In an embodiment, this position can be estimated by an expert, positioning the denture manually using 3D animation software. Alternatively, the estimation can be performed from the aforementioned database via a Deep Learning based method (artificial neural network) who learns to estimate the 3D denture model movement from a 2D face image. Once trained, the network can be used in real-time to estimate the 3D denture position from a 2D photograph of the patient's face.

Preferably, the artificial neural network uses a regression convolutional neural network, whose input is a tuple formed by the 2D input face image together with the 2D neutral face image and whose output is a twelve-dimensional real vector. Said vector codifies the movement performed by each part of the denture (6D for the superior maxillary and 6D for the inferior mandible) in the following order: translation X, Y, Z and rotation angles X, Y, Z.

Figure 2:
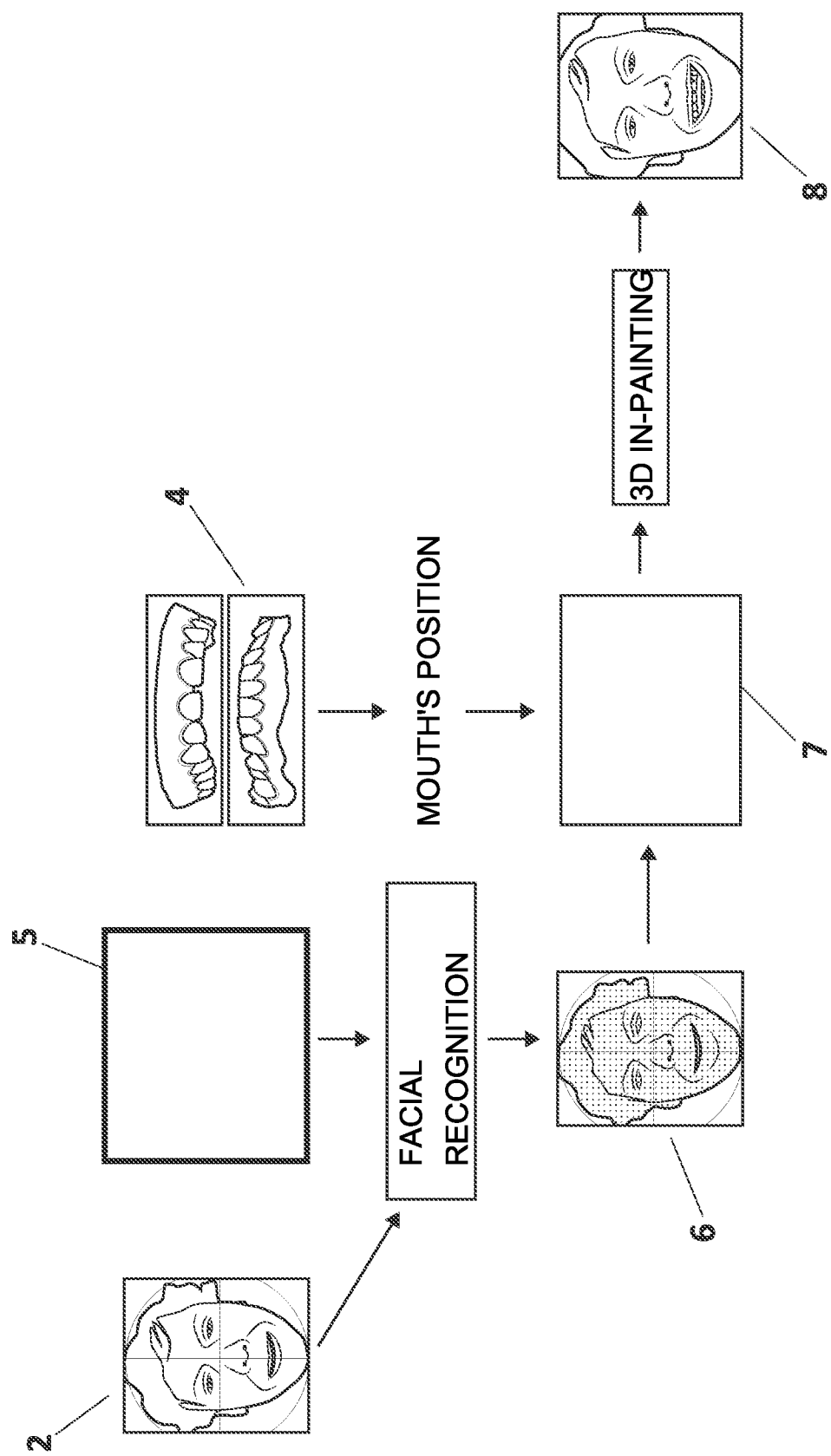
FIG. 2.—Shows a flowchart of the second phase of the proposed method: the animation of the head and denture 3D models.

In the second phase of the method, shown in FIG. 2, the esthetics of the new denture of the patient is simulated (independently to the type of teeth reconstruction performed, partial or total) and at the same time the natural, real facial movements and expressions of the patient are captured (e.g., smile, frown, talking, head movements, etc.).

Input data are the 3D head and denture models (2,4) created during the first phase, together with 2D images of the patient (5). The 2D images (5) can be captured with a standard video camera or with a smartphone for example, and can be either previously stored or acquired in real-time. They can portray any action the patient desires (facial expressions, conversation, head movements, etc.)

In this second phase, the movements performed by the patient in the 2D images (5) will then be reflected in a new simulated video (8) (or in real-time) allowing the patient to see how each one of the movements performed is translated into a full 3D model (7), seeing how the denture reconstruction will look like. To this effect, the second phase comprises a series of steps.

Figure 3:
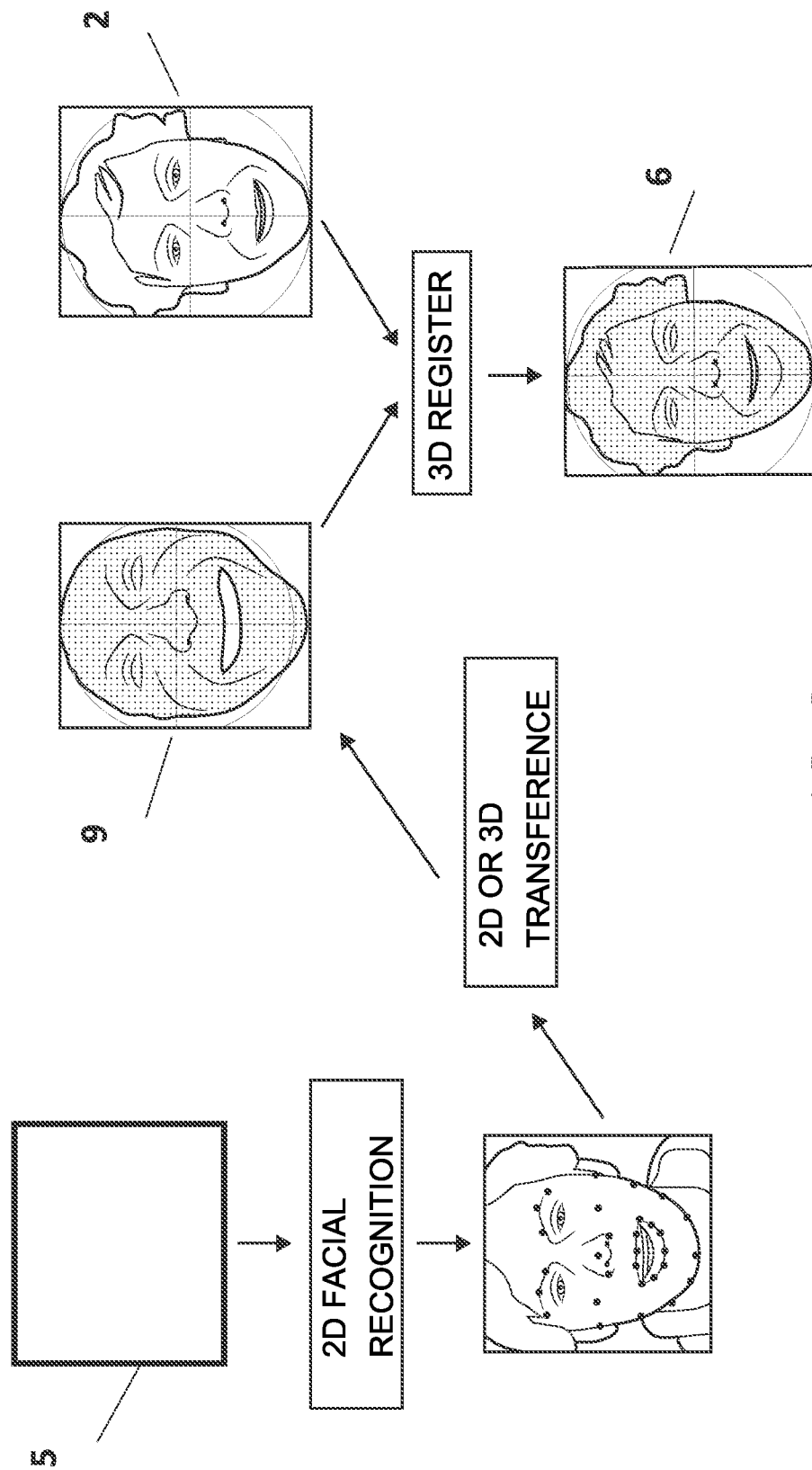
FIG. 3.—Shows a flowchart of the steps required for the animation of the 3D model from the 2D images of the patient.

In the first step, an animation of the 3D head model (2) is performed based on the 2D input images (5). Given an input video (5) (or real-time footage), composed of individual frames (color 2D images of the patient's face), the 3D head mesh (2) is animated correspondingly. FIG. 3 shows a flowchart of the proposed method.

Inputs are the 2D video (5) and the 3D head model (2). The output is the 3D animated model (6) mimicking the movement observed in the 2D images (5), both in terms of the general head position as well as its facial physiognomy. This is performed in two separate steps, outlined in FIG. 3. First, using facial recognition techniques, the position and movement of the patient in the 2D video (5) is estimated. Then, these movements are transferred to a general 3D head model (9). Several approaches can be used in order to achieve this.

For example, a 2D or 3D facial landmark estimation method can estimate facial movement from the 2D video and then this information can be used to animate the 3D model, or a more direct approach can be used to directly learn relationships between 2D images and 3D models, using deep learning approaches.

Secondly, the movement of the generic model (9) is transferred to the patient's specific 3D head model (2). This is achieved through 3D algebra and triangulation techniques.

Once the 3D head model (2) has been animated to reflect the action represented in the 2D images (5), the 3D denture model (4) needs to be moved correspondingly, taking into account the movement of the mandible, lips, and maxillary.

The amount of movement to apply to the 3D denture (4) with respect to the 3D head model (2) is computed preferably by using the artificial neural network obtained during the first phase, resulting in an estimation of the 3D denture's position.

Finally, as shown in FIG. 2, once the head and denture 3D models (2,4) are in their correct position, the final 3D scene rendering (7) is computed and projected back to 2D, obtaining a simulation video (8). The projection is done in such a way that the final model in the simulation video (8) has a similar size and position compared to the 2D input video (5), so that the simulation is more realistic and aesthetically plausible with respect to the real input.

The invention claimed is:

1. A method for the generation of a head and virtual denture of a patient, wherein said method comprises:
    data preparation, which in turn comprises:
        generation of a 3D virtual model of the head, obtained from images of a patient under study,
        generation of a 3D virtual denture model of a patient's denture, obtained from data of the patient's teeth morphology,
        determining the position of the 3D virtual denture model with respect to the 3D virtual model of the head,
        fusion and anchoring of the 3D virtual denture model inside the 3D virtual model of the head in a neutral state,
        training an artificial neural network on a database of 2D images of people performing different facial gestures and its corresponding 3D model with denture included in its corresponding position, learning the artificial neural network to estimate a movement of the 3D virtual denture model with respect to the 3D virtual model of the head,
    integration of the movement of the 3D virtual model of the head and 3D virtual denture model, which in turn comprises:
        animation of the 3D virtual model of the head from a set of 2D images of the patient, resulting in an animated 3D model of the patient's head,
        independently positioning the 3D virtual denture model inside the animated 3D model, by applying an amount of movement to the 3D virtual denture model estimated from the set of 2D images of the patient by using the artificial neural network trained during the data preparation, and
        fusion of the 3D virtual denture model with the animated 3D model, resulting in a fully animated 3D model consisting of the patient's head and denture.

2. The method according to claim 1, wherein the images of the patient under study are images selected among photographs, video and/or a 3D scan of the patient's head.

3. The method according to claim 1, wherein the 3D virtual denture model comprising a model of the upper denture, a model of the lower denture and information of their relative position and occlusion.

4. The method according to claim 1, wherein the data of the patient's teeth morphology is obtained from an intraoral scanner and/or digitized conventional impressions.

5. The method according to claim 1, wherein the data preparation phase additionally comprises a step during which methods of digital waxing, orthodontic movements and/or surgeries planification are applied to the 3D virtual denture model.

6. The method according to claim 1, wherein the set of 2D images of the patient are taken from a previously recorded video of the patient.

7. The method according to claim 1, wherein the set of 2D images of the patient are taken in real-time using a camera.

8. The method according to claim 1, wherein the animation of the 3D virtual model of the head from 2D images of the patient further comprises:
  estimating, with facial recognition techniques, information on the position and movement of the patient in the set of 2D images of the patient,
  transferring said information to a generic 3D head model, and
  transferring said movement from the generic 3D head model to the 3D virtual model of the head.

9. The method according to claim 1, wherein in the positioning of the 3D denture model from the set of 2D images of the patient, a neutral position of the 3D virtual denture model is taken into account to compute how much movement needs to be applied to the 3D virtual denture model as a function of how much movement is observed in the set of 2D images of the patient.

10. The method according to claim 1, further comprising a step of in-painting and texture addition to the fully animated 3D model.

11. The method according to claim 1, further comprising a final step of projection of the fully animated 3D model to 2D, obtaining a simulation video.

12. A data-processing system for the generation of a head and virtual denture of a patient, said data-processing system comprising:
  a processor configured to:
    generate a 3D virtual model of the head, obtained from images of a patient under study,
    generate a 3D virtual denture model of the patient's denture, obtained from data of the patient's teeth morphology,
    determine the position of the 3D virtual denture model with respect to the 3D virtual model of the head,
    fusion and anchor the 3D virtual denture model inside the 3D virtual model of the head in a neutral state,
    train an artificial neural network on a database of 2D images of people performing different facial gestures and its corresponding 3D model with denture included in its corresponding position, learn the artificial neural network to estimate a movement of the 3D virtual denture model with respect to the 3D virtual model of the head,
    animate the 3D virtual model of the head from 2D images of the patient, resulting in an animated 3D model of the patient's head,
    independently position the 3D virtual denture model inside the animated 3D model, by applying an amount of movement to the 3D virtual denture model estimated from 2D images of the patient by using the artificial neural network, and
    merge the 3D virtual denture model with the animated 3D model, resulting in a fully animated 3D model consisting of the patient's head and denture.

13. A non-transitory computer-readable storage medium storing the steps for the generation of a head and virtual denture of a patient, said non-transitory computer-readable storage medium configured to be executed by a processor to carry out the steps of the method of claim 1.

* * * * *